J. McTAMMANY.
MACHINE FOR PERFORATING MASTER SHEETS FOR OPERATING TYPE WRITERS, &c.
APPLICATION FILED FEB. 7, 1912.
1,063,818.
Patented June 3, 1913.
2 SHEETS—SHEET 1.
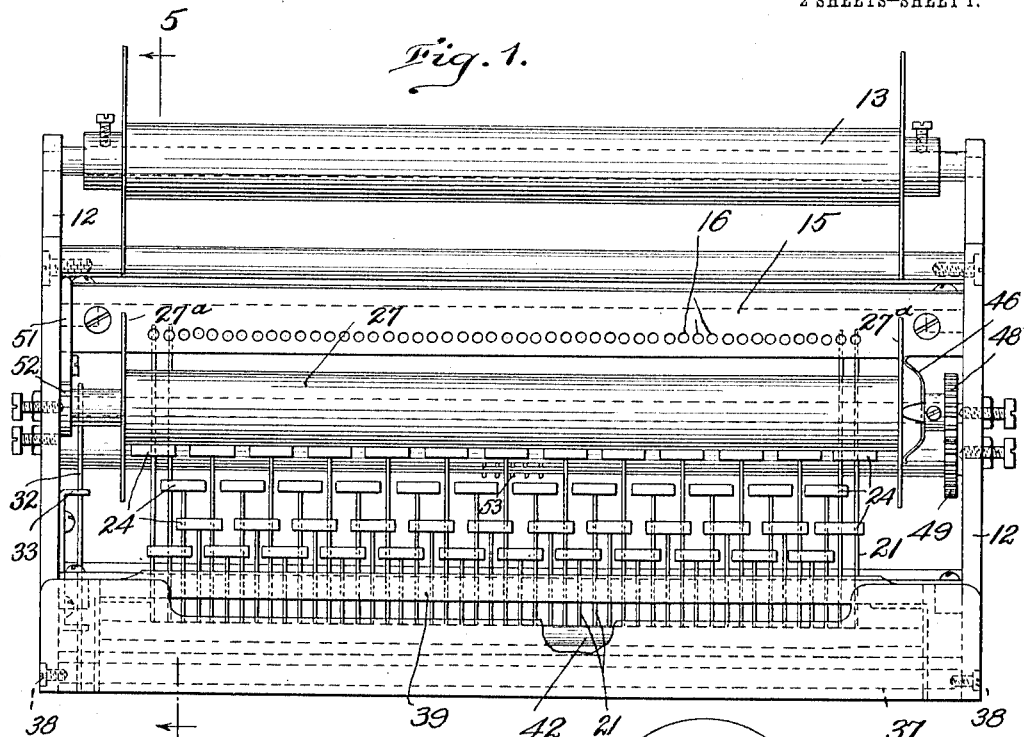
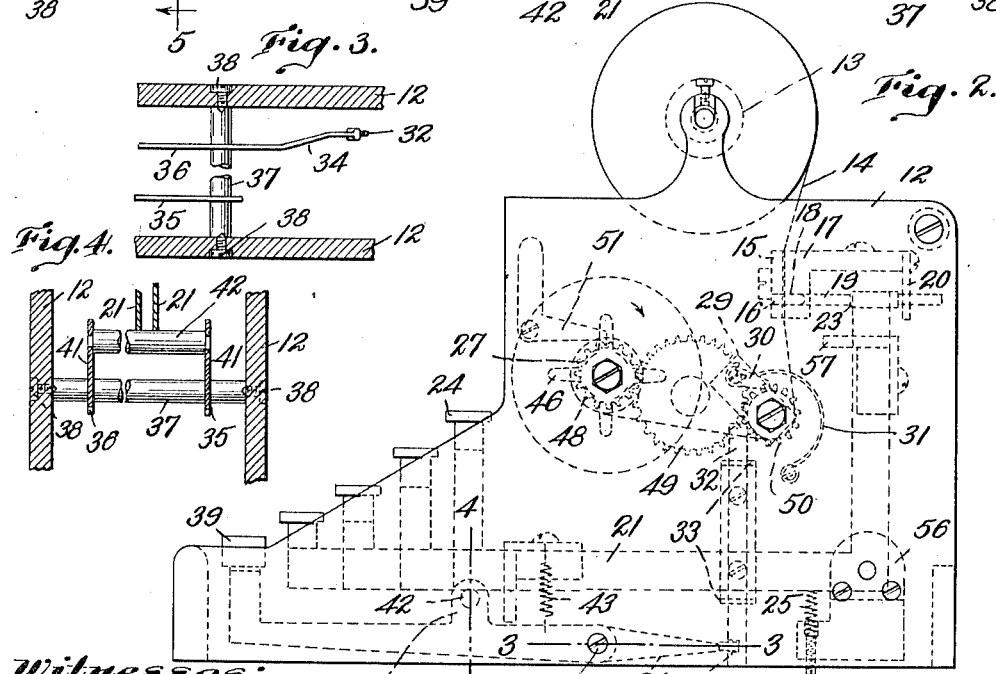

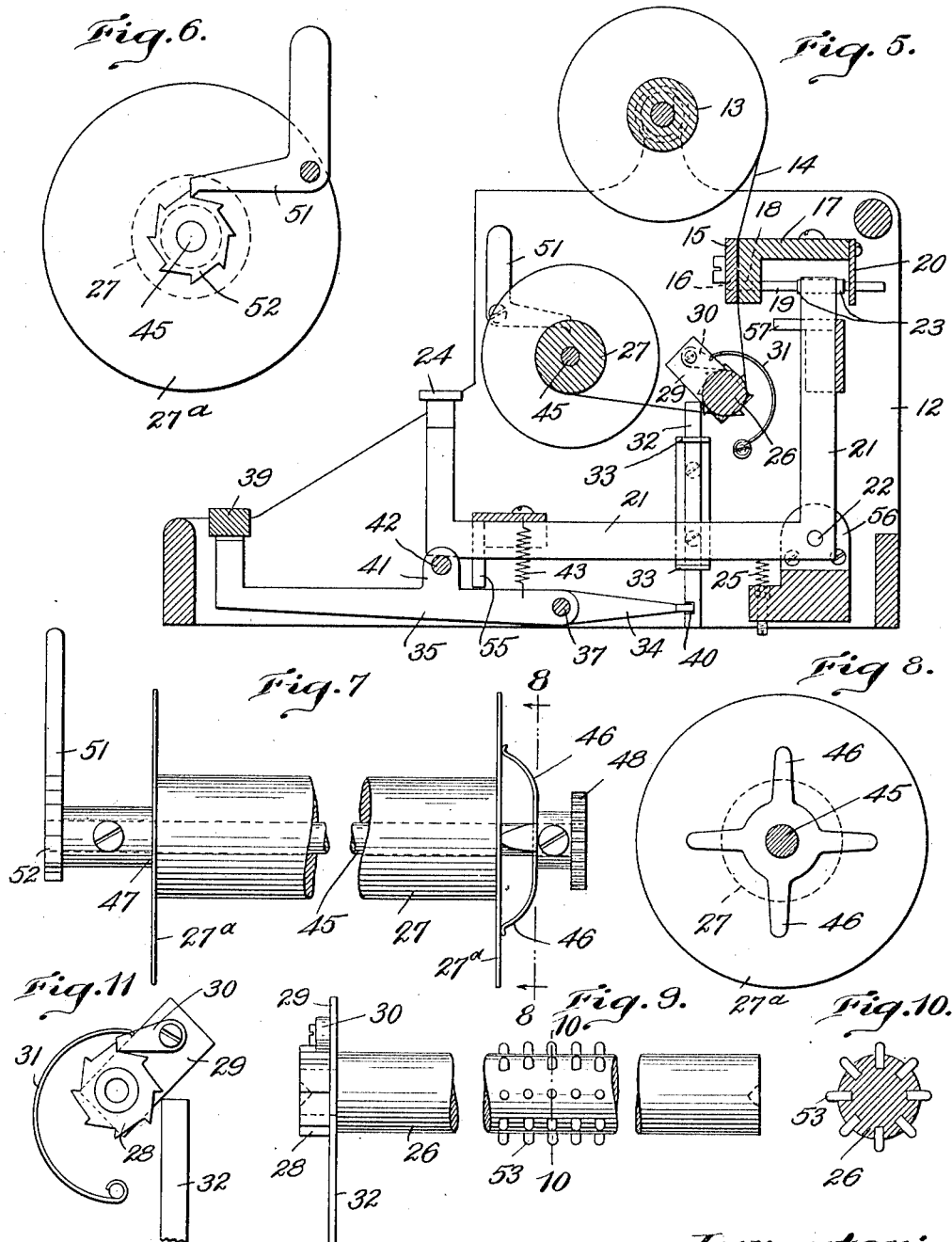

UNITED STATES PATENT OFFICE.

JOHN McTAMMANY, OF STAMFORD, CONNECTICUT.

MACHINE FOR PERFORATING MASTER-SHEETS FOR OPERATING TYPE-WRITERS, &c.

1,063,818.  Specification of Letters Patent.  Patented June 3, 1913.

Application filed February 7, 1912. Serial No. 676,145.

*To all whom it may concern:*

Be it known that I, JOHN McTAMMANY, a citizen of the United States, and a resident of Stamford, in the county of Fairfield and State of Connecticut, have invented certain new and useful Improvements in Machines for Perforating Master-Sheets for Operating Type-Writers, &c., of which the following is a specification.

This invention has for its object to provide a simple compact and easily operated machine for producing a perforated master-sheet adapted to be used as a part of the automatic typewriter operating mechanism set forth in another application for Letters Patent of the United States filed by me concurrently herewith, Serial No. 676,144.

The invention consists in the improvements which I will now proceed to describe and claim.

Of the accompanying drawings: Figure 1 represents a front elevation of a perforating machine embodying my invention; Fig. 2 represents an end elevation of the same; Fig. 3 represents a fragmentary section on line 3—3 of Fig. 2; Fig. 4 represents a fragmentary section on line 4—4 of Fig. 2; Fig. 5 represents a section on line 5—5 of Fig. 1; Fig. 6 represents an end view of the receiving spool or reel hereinafter described, and the ratchet and pawl for preventing backward rotation thereof; Fig. 7 represents a fragmentary side elevation of the receiving spool or reel and of the shaft on which it is mounted; Fig. 8 represents a section on line 8—8 of Fig. 7; Fig. 9 represents a fragmentary elevation of the roll which feeds the master-sheet; Fig. 10 represents a section on line 10—10 of Fig. 9; Fig. 11 represents an elevation showing the parts of the mechanism which rotate the feed roll step-by-step.

The same reference characters indicate the same parts in all the figures.

The supporting frame or housing 12 is or may be of the same general form of the frame of various well known standard typewriters.

13 represents a supply spool or roll from which the paper sheet 14 passes to the perforating punches and dies, said spool being journaled in bearings on the upper portion of the frame and adapted to rotate loosely and permit the unwinding of the sheet.

15 represents a fixed horizontal bar constituting the punch bed or die, said bar being provided with a row of orifices 16 corresponding in number to the keys of an ordinary typewriter, each orifice constituting a die adapted to coöperate with a perforating punch.

17 represents a fixed horizontal bar separated from the bar 15 by a narrow slot or crevice, through which the sheet 14 passes, and provided with a row of guide orifices 18 corresponding in number to the punch dies 16 and registering therewith. The punches 19 are adapted to reciprocate in the guide orifices 18 and in corresponding guide orifices in a flange 20 attached to the bar 17, each punch being formed to coöperate with the corresponding die in cutting a circular hole in the sheet 14. The punches are reciprocated in their guides by a series of key levers 21 corresponding in number to the punches. The levers are of angular form and are fulcrumed at 22. The vertical arm of each lever is engaged with shoulders 23 on the corresponding punch 19 in such manner that oscillatory movements of the lever impart rectilinear movements to the punch. The horizontal arm of each lever is extended upwardly at its outer end and provided with a finger key 24 the arrangement of the levers and keys resembling that of the levers and keys of well known typewriters, as indicated by Figs. 1 and 2. The levers are normally supported by springs 25 so that the punches 19 are normally retracted, as shown by Fig. 5, the keys 24 being raised.

26 represents a feed roll located below the punches and adapted to feed the sheet 14 step-by-step, the sheet passing partly around the feed roll to a receiving roll or spool 27 which is rotated, as hereinafter described, to take up the sheet as fast as it is perforated. The feed roll 26 is journaled in bearings in the frame and to one of its ends is attached a ratchet 28. 29 represents an arm adapted to oscillate on the feed roll 26, said arm carrying a pawl 30 which is held by a spring 31 in engagement with the ratchet 28. The arm 29 is oscillated conjointly by the spring 31 and by a reciprocating vertical rod 32 which is movable in fixed guides 33. The upper end of said rod 32 is in contact with the arm 29 which is pressed against the rod by the spring 31. With the lower end of the rod 32 is engaged an arm 34 forming a part of an oscillatory frame which in this embodiment of the invention is composed of longitudinal members 35, 36, a transverse rock shaft 37 rigidly connected with said members and mounted to rock on pivots 38, the outer ends of the arms 35, 36 being extended upwardly and connected by a transverse push piece 39. The said oscillatory frame is adapted to be oscillated on the pivots 38 and thus oscillate the arm 34 which is an extension of the member 36, as shown by Fig. 3.

The outer end of the arm 34 enters a notch or recess 40 in the rod 32 so that the oscillating movements of said arm impart rectilinear reciprocating movements to the rod 32, the latter being caused to alternately move the arm 29 against the stress of the spring 31 and to permit the spring to move the arm in the opposite direction. The pawl 30 is thus moved sufficiently to impart a step-by-step rotation to the feed roll through the ratchet 28. The side members 35, 36 of the oscillatory frame are provided with upwardly projecting ears 41, to which is attached a cross bar 42. The forward arms of the key levers 21 rest on this cross bar so that whenever a key lever is depressed to project the corresponding punch 19, the outer portion of the oscillatory frame is depressed and the arm 34 thereof is raised, thus moving the rod 32 upwardly. The arm 34 and rod 32 are normally pressed downwardly by means of springs 43.

The punches 19 are normally retracted so that when a key lever 21 is depressed it causes a partial rotation of the feed roll through the mechanism above described before the punch reaches the sheet 14, the punch entering and perforating the sheet just at the close of the feeding movement caused by the partial rotation of the feed roll. The oscillatory frame may be operated to cause the feeding of the sheet independently of the key levers by downward pressure on the push bar 39. The receiving roll 27 is mounted loosely on a shaft 45 journaled in bearings in the supporting frame. The ends or heads 27ª of the spool 27 are frictionally engaged to prevent loose rotation of the spool 27.

46, 46 represent a series of tension springs mounted on the shaft 45 and bearing against one of said heads, said springs retarding rotation of the spool 27 and at the same time pressing the other head 27ª against one end of the sleeve 47 attached to the shaft 45.

48 represents a gear attached to the shaft 45 and connected through an intermediate gear 49 with a gear 50 attached to the feed roll, said gears imparting rotary movement from the feed roll to the shaft 45 in the direction indicated by the arrow in Fig. 2. Backward rotation of the shaft 45 is prevented by a gravity pawl 51, Fig. 6, pivoted to the supporting frame and a ratchet 52 attached to the shaft 45 and engaged by said pawl.

The central part of the feed roll 26 is provided with radial pins 53 which are adapted to enter previously formed orifices in the sheet 14 and thus cause a positive feeding movement of the sheet. The radial pins 53 so engage the orifices in the sheet as to positively advance the latter and render it certain that the apertures formed by the punches 19 will be accurately spaced longitudinally of the sheet. It is of course essential that the proper engagement of the sheet and its previously formed orifices with the feed roll and its pins or projections 53 shall be preserved. Since the receiving roll is mounted loosely on the shaft 45, but is frictionally engaged and driven by the springs 46 mounted on said shaft, said shaft being driven by the gear train described, the receiving roll is thereby operated to keep the sheet under the necessary tension mentioned.

It will be seen that when the parts are in their normal positions, as shown by Fig. 5, the pawl-carrying arm 29 is inclined at a considerable angle over the rod 32 and that the upward movement of said rod moves the arm 29 to approximately a vertical position. The rotation of the feed roll occurs during the first part of the upward movement of the rod 32, caused by the depression of a key lever 21, and before the punch 19 carried by the depressed lever 21, reaches the sheet. When the punch encounters the sheet, the feed movement of the roll has ceased, the arm 29 having then been moved to a substantially vertical position so that its edge, in contact with the rod 32, is substantially parallel with the path of the rod. After this, the movement of the key lever 21 is continued sufficiently to force the punch through the sheet while the latter is at rest. On the release of the depressed key lever the spring 25 returns the lever to its normal position and retracts the punch. Each depression of a key 24 therefore feeds the sheet one space and causes the corresponding punch to perforate the sheet, the hole being spaced lengthwise of the sheet from the preceding hole, and occupying a position crosswise of the sheet corresponding to the letter or other character represented by the depressed key, so that when the master-sheet has been completely perforated and is used as a part of an automatic typewriter operator, the key levers of the typewriter corresponding to the manipulated key levers of the perforating machine will be operated to print the desired characters on a sheet inserted in the typewriter. The ends of the master-sheet may be fastened together to form an endless band adapted to cause the automatic operator to repeat indefinitely in printing on successive sheets duplicates of the matter for which the master-sheet was perforated. The key levers 21 are movable between guides 55, 56, 57 which prevent their sidewise displacement.

I claim:

1. A manually operated perforating machine comprising a supply roll, a receiving roll, an intermediate feed roll having projections to engage a sheet to positively advance the latter, sheet perforating means between the supply roll and the feed roll, including a series of punches, means for operating the receiving roll to keep the sheet under tension, manually operated key levers engaged with the punches, and mechanism operated by the depression of either of said levers for successively moving the feed roll to feed the sheet, and forcing the corresponding punch through the sheet.

2. A manually operated perforating machine comprising a supply roll, a receiving roll, an intermediate feed roll, sheet perforating means between the supply roll and the feed roll, including a series of punches, manually operated key levers engaged with the punches, an oscillatory arm mounted on the feed roll, and carrying a pawl engaged with a ratchet on the feed roll, a vertically movable rod bearing against one side of said arm, and connections between said rod and key levers, whereby the depression of either lever causes an endwise upward movement of the rod, the pawl-carrying arm being normally inclined over the rod.

3. A manually operated perforating machine comprising a supply roll, a receiving roll, an intermediate feed roll having projections to engage a sheet to positively advance the latter, sheet perforating means between the supply roll and the feed roll, including a series of punches, means for operating the receiving roll to keep the sheet under tension, manually operated key levers engaged with the punches, and mechanism operated by the depression of either of said levers for successively moving the feed roll to feed the sheet, and forcing the corresponding punch through the sheet, said mechanism being operable independently of the key levers to move the sheet without perforating it.

4. A manually operated perforating machine comprising a supply roll, a receiving roll, an intermediate feed roll, sheet perforating means between the supply roll and the feed roll, including a series of punches, manually operated key levers engaged with the punches, an oscillatory arm mounted on the feed roll, and carrying a pawl engaged with a ratchet on the feed roll, a vertically movable rod bearing against one side of said arm, and an oscillatory frame engaged with said rod and with the key levers, said frame being movable by the depression of either key lever to cause an endwise upward movement of the rod.

5. A manually operated perforating machine comprising a supply roll, a receiving roll, an intermediate feed roll, sheet perforating means between the supply roll and the feed roll, including a series of punches, manually operated key levers engaged with the punches, an oscillatory arm mounted on the feed roll, and carrying a pawl engaged with a ratchet on the feed roll, a vertically movable rod bearing against one side of said arm, and an oscillatory frame engaged with said rod and with the key levers, said frame being movable by the depression of either key lever to cause an endwise upward movement of the rod, and being also movable independently of the key levers to cause the feeding of the sheet without perforating it.

6. A manually operated perforating machine comprising a supply roll, a receiving roll, an intermediate feed roll, sheet perforating means between the supply roll and the feed roll, including a series of punches, manually operated key levers engaged with the punches, mechanism operated by the depression of either of said levers for successively moving the feed roll to feed the sheet and forcing the corresponding punch through the sheet, a shaft supporting the receiving roll, said roll being rotatable independently of the shaft, gearing connecting the shaft with the feed roll, and means for frictionally engaging the receiving roll with the shaft.

In testimony whereof I have affixed my signature, in presence of two witnesses.

JOHN McTAMMANY.

Witnesses:
GEORGE R. CLOSE,
MABEL E. HAMILTON.

---

Copies of this patent may be obtained for five cents each, by addressing the "Commissioner of Patents, Washington, D. C."